(12) United States Patent  (10) Patent No.: US 8,113,171 B2
Akiyama  (45) Date of Patent: Feb. 14, 2012

(54) ENGINE INTAKE SYSTEM

(75) Inventor: Hiroshige Akiyama, Miyagi (JP)

(73) Assignee: Keihin Corporation, Tokyo (JP)

( * ) Notice: Subject to any disclaimer, the term of this patent is extended or adjusted under 35 U.S.C. 154(b) by 468 days.

(21) Appl. No.: 12/092,727

(22) PCT Filed: Oct. 27, 2006

(86) PCT No.: PCT/JP2006/321505
§ 371 (c)(1),
(2), (4) Date: Sep. 3, 2009

(87) PCT Pub. No.: WO2007/052554
PCT Pub. Date: May 10, 2007

(65) Prior Publication Data
US 2010/0006052 A1 Jan. 14, 2010

(30) Foreign Application Priority Data

Nov. 7, 2005 (JP) ................................ 2005-321853
Nov. 7, 2005 (JP) ................................ 2005-321854

(51) Int. Cl.
F02B 37/12 (2006.01)
(52) U.S. Cl. ..................................... 123/399; 73/114.37
(58) Field of Classification Search .................. 123/399, 123/400; 73/114.33, 114.36, 114.37
See application file for complete search history.

(56) References Cited

U.S. PATENT DOCUMENTS

| 4,489,595 | A | * | 12/1984 | Klomp et al. | 73/114.37 |
| 4,549,517 | A | * | 10/1985 | Kamiyama | 123/478 |
| 4,969,354 | A | * | 11/1990 | Kosuda et al. | 73/114.37 |
| 6,003,379 | A | * | 12/1999 | Ichikawa et al. | 73/708 |
| 6,453,886 | B2 | * | 9/2002 | Takano et al. | 123/520 |
| 6,604,424 | B1 | * | 8/2003 | Kawabe et al. | 73/716 |
| 6,725,833 | B1 | * | 4/2004 | Irihune et al. | 123/399 |
| 6,837,220 | B2 | * | 1/2005 | Hirano et al. | 123/463 |
| 7,044,106 | B2 | * | 5/2006 | Kojima et al. | 123/337 |
| 7,305,966 | B2 | * | 12/2007 | Musashi et al. | 123/399 |
| 7,415,346 | B2 | * | 8/2008 | Musashi et al. | 701/103 |

(Continued)

FOREIGN PATENT DOCUMENTS

JP 2001-132493 A 5/2001

(Continued)

Primary Examiner — Thomas Moulis
(74) Attorney, Agent, or Firm — Arent Fox LLP

(57) ABSTRACT

An engine intake system is provided that includes a sensor unit (16) formed by mounting a throttle sensor (18) and a negative pressure sensor (20) on a sensor housing (17) mounted on a mounting face (15) on one side of a throttle body (1), and a negative pressure transmission path (35) providing communication between an intake path (2) and the negative pressure sensor (20) is formed in a crank shape from a first passage (35a) having one end opening on a peripheral face of an upper half of the intake path (2) in proximity to a horizontal plane (H) containing the axis of the intake path (2), a groove-shaped second passage (35b) formed between mating faces of the throttle body (1) and the sensor housing (17) so as to extend while bending upward from the other end of the first passage (35a) at substantially right angles, and a third passage (35c) formed in the throttle body (1) so as to extend from the upper end of the second passage (35b) in a direction opposite to the first passage (35a) and reach the negative pressure sensor (20). It is thus possible to prevent fuel, foreign matter such as carbon, or blow-back gas from entering the negative pressure sensor via the negative pressure transmission path.

5 Claims, 7 Drawing Sheets

U.S. PATENT DOCUMENTS 7,779,809 B2 * 8/2010 Musashi et al. ............... 123/337
7,934,419 B2 * 5/2011 Saito et al. ................. 73/114.37

FOREIGN PATENT DOCUMENTS

| | | |
|---|---|---|
| JP | 2002-295272 A | 10/2002 |
| JP | 2002-332936 A | 11/2002 |
| JP | 2002-349397 A | 12/2002 |
| JP | 2003-49678 A | 2/2003 |
| JP | 2003-148303 A | 5/2003 |
| JP | 2004-225707 A | 8/2004 |
| WO | WO 02/44541 A1 | 6/2002 |
| WO | WO 2004/074661 A1 | 9/2004 |
| WO | WO 98/39695 A2 | 9/2008 |

* cited by examiner

ENGINE INTAKE SYSTEM

CROSS-REFERENCE TO RELATED APPLICATION

This application is a National Stage entry of International Application No. PCT/JP2006/321505, filed Oct. 27, 2006, the entire specification claims of and drawings of which are incorporated herewith by reference.

TECHNICAL FIELD

The present invention relates to an improvement of an engine intake system that includes a throttle body having a horizontal intake path, a butterfly type throttle valve mounted on a valve shaft horizontally and rotatably supported by a bearing hole of the throttle body, the throttle valve opening and closing the intake path, and a sensor unit formed by mounting a throttle sensor and a negative pressure sensor on a sensor housing mounted on one side of the throttle body, the throttle sensor detecting a degree of opening of the throttle valve, the negative pressure sensor detecting an intake negative pressure of the intake path, and the intake path and the negative pressure sensor being connected via a negative pressure transmission path.

BACKGROUND ART

Such an engine intake system is already known, as disclosed in Patent Publication 1.
Patent Publication 1: Japanese Patent Application Laid-open No. 2002-332936

DISCLOSURE OF THE INVENTION

Problems to be Solved by the Invention

As shown in FIG. 8, in a conventional engine intake system, a negative pressure transmission path 35 for transmitting an intake negative pressure generated in an intake path 2 of a throttle body 1 to a negative pressure sensor 20 when an engine is running is formed in a hook shape from a first passage 35a and a second passage 35b, which are connected to each other at right angles, and care is thus taken that blow-back gas from the engine does not reach the negative pressure sensor 20. However, since the first passage 35a is disposed so as to open in the intake path 2 at a point a considerable distance below a horizontal plane H containing the axis of the intake path 2 (=the axis of a valve shaft 5a of a throttle valve 5), there is a possibility that fuel droplets that have become attached to an inner peripheral face of the intake path 2 and flowed down might enter the first passage 35a. Furthermore, when a plurality of types of throttle body in which the diameter of the intake path 2 varies are produced by casting or injection without changing the shape of a mounting face 15 of the throttle body 1 for a sensor unit 16, since for an intake path 2L with a large diameter the inner peripheral face of the intake path 2 enlarges so as to remove an end portion of the first passage 35a on the intake path side, the first passage 35a is shortened and the effect due to bending of the negative pressure transmission path 35 is lessened, and as a result blow-back gas is allowed to enter the negative pressure sensor 20.

The present invention has been accomplished in the light of such problems, and it is an object thereof to provide an engine intake system that makes it difficult for fuel or foreign matter such as carbon attached to the inner peripheral face of an intake path to enter a negative pressure transmission path, that prevents a first passage of the negative pressure transmission path from being greatly shortened even when a plurality of types of throttle body in which the diameter of the intake path varies are produced by casting, etc. without changing the shape of a part of the throttle body for mounting a sensor housing, and that can prevent blow-back gas from entering a negative pressure sensor whatever the throttle body.

Means for Solving the Problems

In order to attain the above object, according to a first aspect of the present invention, there is provided an engine intake system comprising a throttle body having a horizontal intake path, a butterfly type throttle valve mounted on a valve shaft horizontally and rotatably supported by a bearing hole of the throttle body, the throttle valve opening and closing the intake path, and a sensor unit formed by mounting a throttle sensor and a negative pressure sensor on a sensor housing mounted on one side of the throttle body, the throttle sensor detecting a degree of opening of the throttle valve, the negative pressure sensor detecting an intake negative pressure of the intake path, and the intake path and the negative pressure sensor being connected via a negative pressure transmission path, characterized in that the negative pressure transmission path is formed in a crank shape from a first passage having one end opening on a peripheral face of an upper half of the intake path in proximity to a horizontal plane containing an axis of the intake path, a groove-shaped second passage formed between mating faces of the throttle body and the sensor housing so as to extend while bending upward at substantially right angles from the other end of the first passage, and a third passage formed in the throttle body so as to extend from the upper end of the second passage in a direction opposite to the first passage and reach the negative pressure sensor.

According to a second aspect of the present invention, in addition to the first aspect, the second passage and a seal groove are formed in a mounting face of the throttle body side, the seal groove surrounding the second passage and being equipped with a seal.

According to a third aspect of the present invention, in addition to the first or second aspect, the second passage is disposed within a polygon formed by sequentially joining with straight lines the centers of at least three fastening parts for fastening the throttle body and the sensor housing, the second passage being disposed along one of the straight lines.

According to a fourth aspect of the present invention, in addition to any one of the first to third aspects, there is provided a positioning and fixing structure between a throttle body and a sensor housing in which a positioning recess coaxially surrounding the valve shaft of the throttle valve and a positioning hole spaced from the positioning recess are provided in the mounting face formed on one side of the throttle body, and a positioning tube for mating with the positioning recess and a positioning pin for mating with the positioning hole are formed on the sensor housing, which is made of a synthetic resin and joined to the mounting face via a plurality of bolts, the positioning pin being formed by integrally joining four radially projecting ridges so as to have a cross-shaped cross-section, and the positioning pin being disposed so that a pair of the ridges projecting in opposite directions from each other lie on a straight line joining the center of the positioning tube and the center of the positioning pin.

According to a fifth aspect of the present invention, in addition to the fourth aspect, the positioning pin is clearance-fitted into the positioning hole.

Effects of the Invention

In accordance with the first aspect of the present invention, since the negative pressure transmission path opens on the periphery of the upper half of the intake path, it is possible to prevent fuel droplets that have become attached to the inner peripheral face of the intake path and flowed down from entering the negative pressure transmission path.

Furthermore, even if fuel or foreign matter such as carbon enters the negative pressure transmission path via the intake path due to the intake blow-back phenomenon of the engine, since the negative pressure sensor is a considerable distance above the opening of the negative pressure transmission path in the intake path and, moreover, the negative pressure transmission path is formed from the first to third passages in a crank shape having a large flow path resistance, the above-mentioned foreign matter cannot reach the negative pressure sensor, and it is therefore possible to protect the negative pressure sensor from the foreign matter, thus maintaining the function and durability thereof.

Moreover, when a plurality of types of throttle body in which the diameter of the intake path varies are produced by casting or injection without changing the shape of a part of the throttle body for mounting the sensor unit, and in particular when a throttle body with an intake path having a large diameter is produced, since the amount removed by the enlarged inner peripheral face of the intake path is very small, it is possible to reliably obtain the effect arising from bending of the negative pressure transmission path for any type of throttle body, thereby always preventing foreign matter from entering the negative pressure sensor.

Furthermore, in accordance with the second aspect of the present invention, when molding the throttle body, the second passage and the seal groove can be formed at the same time as the mounting face for the sensor unit, thus contributing to a reduction in the production cost.

Moreover, in accordance with the third aspect of the present invention, it is possible to efficiently make the fastening force of the fastening part act on a seal around the second passage, thereby reliably carrying out sealing around the second passage.

Furthermore, in accordance with the fourth aspect of the present invention, since, when positioning the sensor housing relative to the mounting face of the throttle body, rotation of the sensor housing around the positioning tube is prevented by mating of the positioning pin with the positioning hole, in particular by mating of the pair of positioning ridges of the positioning pin arranged in the direction perpendicular to the straight line with the inner peripheral face of the positioning hole, by taking into consideration only the manufacturing tolerance of the pair of positioning ridges arranged in the direction perpendicular to the straight line a predetermined precision can be obtained in positioning the sensor housing around the positioning tube, thus simplifying quality control and contributing to a reduction in cost. The pair of ridges arranged on the straight line are coupled integrally to the other pair of ridges to thus reinforce each other, thereby strengthening the rigidity of the positioning pin.

Moreover, in accordance with the fifth aspect of the present invention, since the four ridges are clearance-fitted in the positioning hole, even if the sensor housing expands due to heat generated by the engine and the distance between the centers of the positioning tube and the positioning pin changes slightly, the change can be absorbed by the clearance between the positioning pin and the positioning hole, and it is therefore possible to prevent the sensor housing from being distorted and the throttle sensor from malfunctioning.

EXPLANATION OF REFERENCE NUMERALS AND SYMBOLS

1 Throttle Body
2 Intake Path
4 Bearing Hole
5 Throttle Valve
5a Valve Shaft
15 Mounting Face
16 Sensor Unit
17 Sensor Housing
18 Throttle Sensor
20 Negative Pressure Sensor
25 Fastening Part (Mounting Boss)
27 Bolt
35 Negative Pressure Transmission Path
35a First Passage
35b Second Passage
35c Third Passage
37 Seal Groove (First Seal Groove)
42 Polygon
42a Straight Line
50 Positioning Recess
51 Positioning Tube
52 Positioning Hole
53 Positioning Pin
53a, 53b Ridges
H Horizontal Plane Containing Axis of Intake Path
L Straight Line connecting Centers of Positioning Tube and Positioning Pin

BEST MODE FOR CARRYING OUT THE INVENTION

Preferred embodiments of the present invention are explained below by reference to the attached drawings.

Embodiment 1

Figure 1:
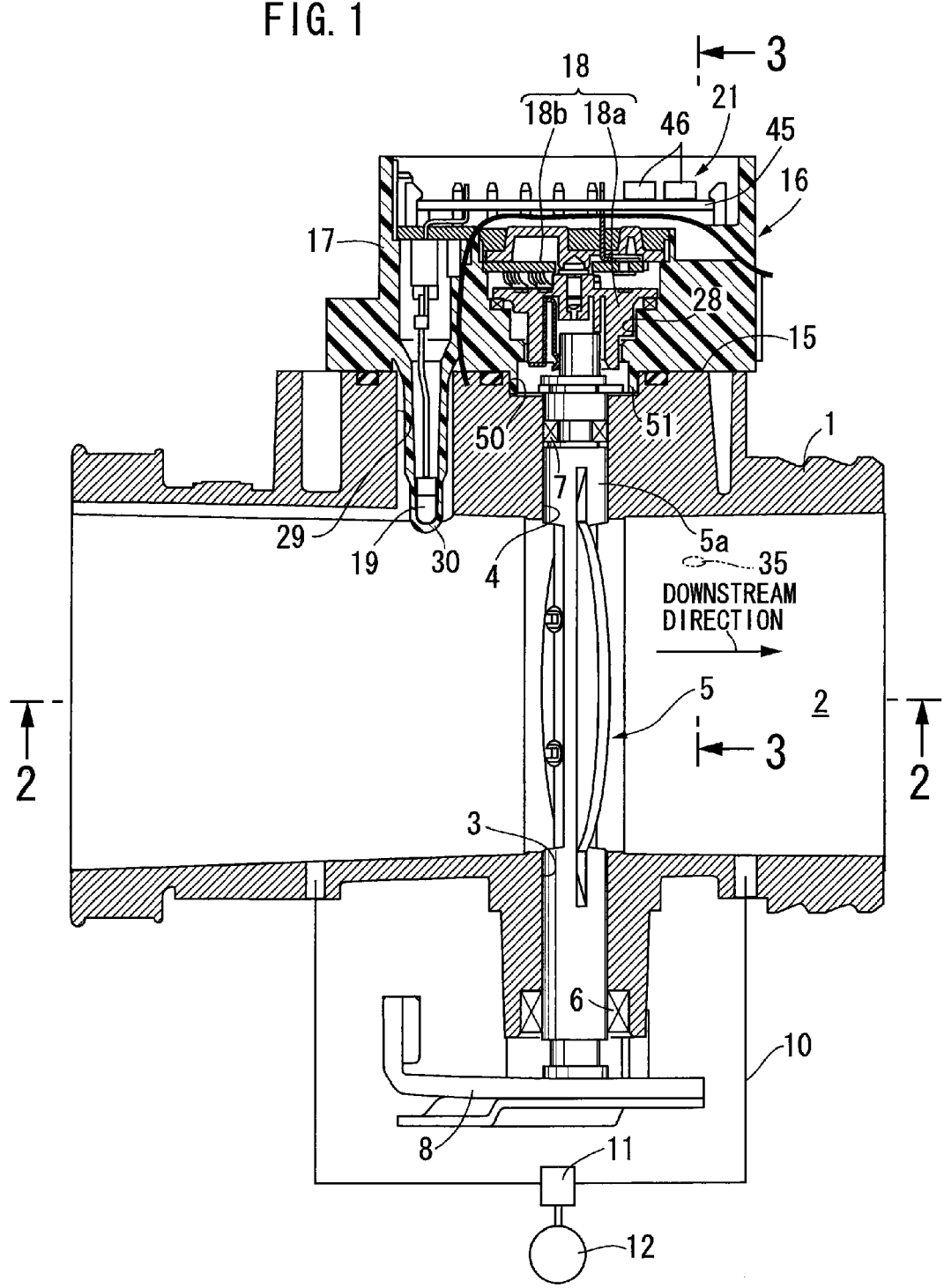
FIG. 1 is a longitudinal sectional plan view of an engine intake system related to the present invention.
Figure 2:
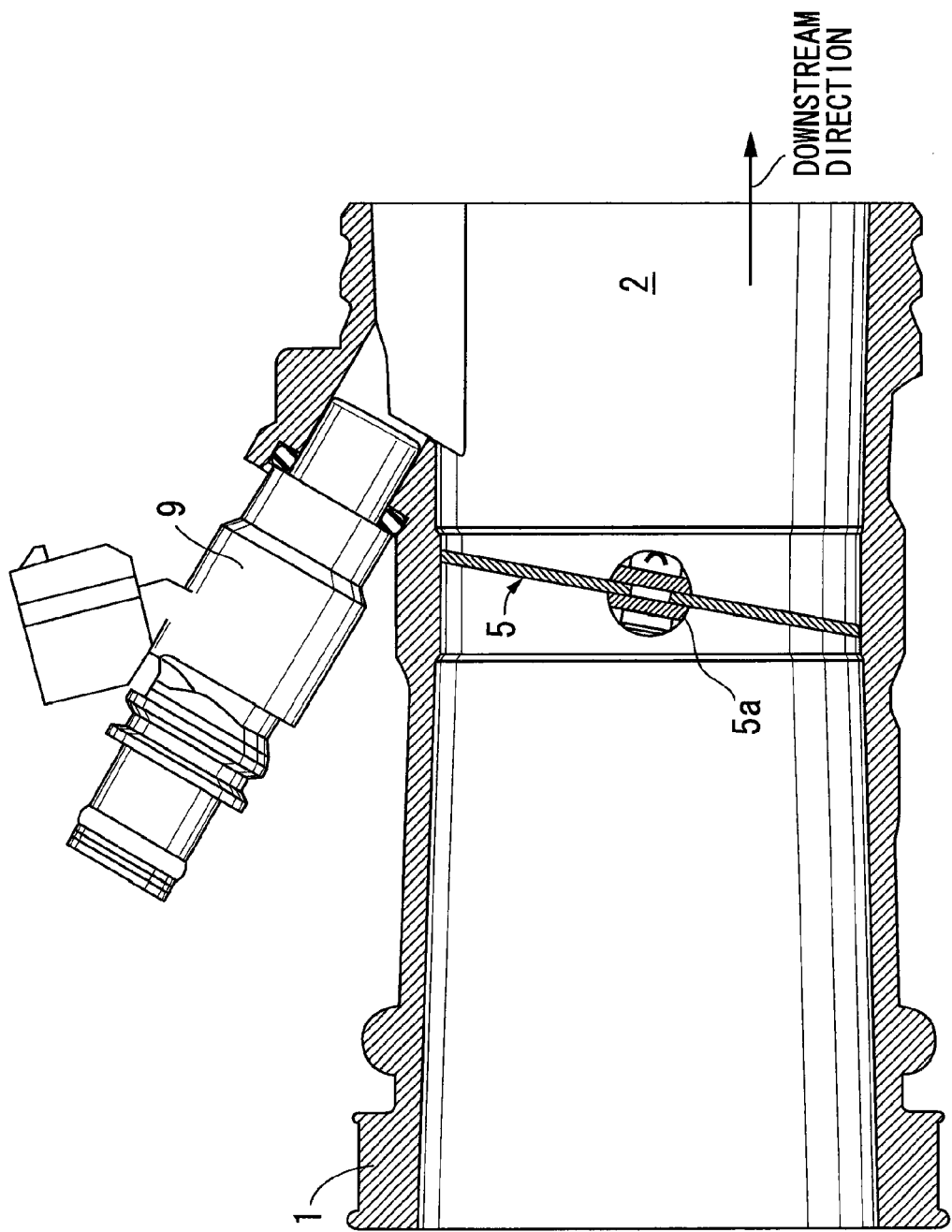
FIG. 2 is a sectional view along line 2-2 in FIG. 1.
Figure 3:
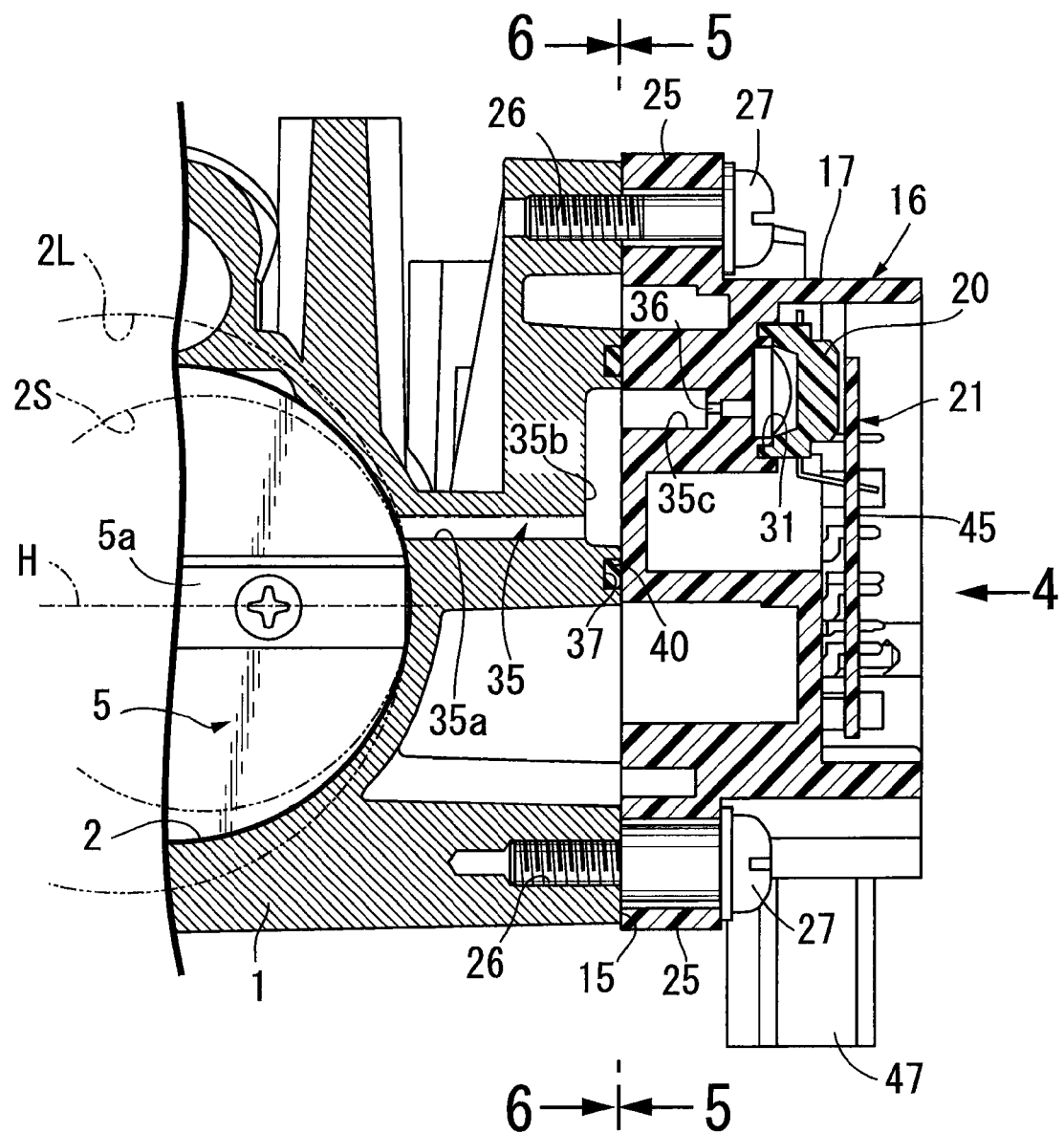
FIG. 3 is a sectional view along line 3-3 in FIG. 1.

Referring firstly to FIG. 1 to FIG. 3, the engine intake system of the present invention includes a throttle body 1 having a horizontal intake path 2 connected to an engine intake port (not illustrated). A pair of bearing holes 3 and 4 are formed in the peripheral wall of the throttle body 1, the bearing holes 3 and 4 being arranged in the horizontal direction with the intake path 2 disposed therebetween, a valve shaft 5a of a butterfly type throttle valve 5 is horizontally and rotatably supported by these bearing holes 3 and 4, the butterfly type throttle valve 5 opening and closing the intake path 2, and the bearing holes 3 and 4 are equipped with seals 6 and 7 respectively that are in intimate contact with an outer peripheral face of the valve shaft 5a. A throttle drum 8 is fixed to one end of the valve shaft 5a projecting to the exterior via the bearing hole 3. Furthermore, an upper wall of the throttle body 1 is equipped with a fuel injection valve 9 that can inject fuel toward the intake path 2 on the downstream side of the throttle valve 5.

A bypass path 10 is formed in a side wall of the throttle body 1 on the throttle drum 8 side, the bypass path 10 being connected to the intake path 2 while bypassing the throttle valve 5, and a bypass valve 11 is provided partway along the bypass path 10, the bypass valve 11 being operated by an electric motor 12 in order to open and close the bypass path 10. When the engine is operating cold, the bypass valve 11 is opened by the electric motor 12 according to the temperature of the engine, thereby enabling air for fast idle to be supplied to the engine via the bypass path 10.

A mounting face 15 is formed on a side face of the throttle body 1 on the side opposite to the throttle drum 8, the mounting face 15 being stepped higher than the other side face, and a sensor unit 16 is mounted on the mounting face 15.

In FIG. 1, and FIG. 3 to FIG. 6, the sensor unit is formed by mounting a throttle sensor 18, an intake temperature sensor 19, a negative pressure sensor 20, and an electronic control unit 21 on a sensor housing 17 joined to the mounting face 15. These components are explained below in sequence.

First, the sensor housing 17 integrally has at least three mounting bosses 25 (three in the illustrated example) on the outer periphery, screw holes 26 corresponding to the mounting bosses 25 are provided in the mounting face 15, and screwing and tightening a bolt 27 inserted into each of the mounting bosses 25 into the corresponding screw hole 26 allows the sensor housing 17 to be fastened to the mounting face 15.

The sensor housing 17 is provided with a rotor support hole 28 positioned coaxially with the bearing hole 4, a rotor 18a connected to an end of the valve shaft 5a is rotatably supported in the rotor support hole 28, and a stator 18b forming the throttle sensor 18 in cooperation with the rotor 18a is fixed to the sensor housing 17. The throttle sensor 18 can detect a degree of opening of the throttle valve 5 by means of the rotor 18a, and output a corresponding electrical signal via the stator 18b.

A through hole 29 is formed in the throttle body 1, the through hole 29 extending from the mounting face 15 to the intake path 2 on the upstream side of the throttle valve 5, a sensor retaining tube 30 is formed integrally with the sensor housing 17, the sensor retaining tube 30 running through the through hole 29 and having its extremity facing the intake path 2, and the sensor retaining tube 30 is equipped with the intake temperature sensor 19 for detecting a temperature on the upstream side of the intake path 2.

Furthermore, a sensor retaining recess 31 is formed in the sensor housing 17 on an outside face sufficiently spaced from the mounting face 15, and the sensor retaining recess 31 is equipped with the negative pressure sensor 20.

As clearly shown in FIG. 3, a negative pressure transmission path 35 providing communication between the intake path 2 on the downstream side of the throttle valve 5 and the negative pressure sensor 20 is provided from the throttle body 1 to the sensor housing 17. This negative pressure transmission path 35 is formed in a crank shape from a first passage 35a provided in the throttle body 1 so as to have one end in proximity to a horizontal plane H containing the axis of the intake path 2 and to open on a peripheral face of an upper half of the intake path 2 and extend horizontally, a groove-shaped second passage 35b formed between mating faces of the throttle body 1 and the sensor housing 17 so as to extend while bending upward from the other end of the first passage 35a at substantially right angles, and a third passage 35c formed in the sensor housing 17 so as to extend again horizontally from the upper end of the second passage 35b and reach the negative pressure sensor 20, and the third passage 35c is provided with an orifice 36 for attenuating pulsations of the negative pressure transmitted.

The groove-shaped second passage 35b is formed in the mounting face 15 of the throttle body 1 in the illustrated example, and a first seal groove 37 surrounding the second passage 35b, a second seal groove 38 surrounding the throttle sensor 18, and a third seal groove 39 surrounding the through hole 29 are formed in the mounting face 15 so as to communicate with each other. These seal grooves 37 to 39 are equipped with a series of seals 40. If the second passage 35b and the first to third seal grooves 37 to 39 are formed in the mounting face 15 in this way, when the throttle body 1 is produced by casting or injection molding, the second passage 35b and the seal grooves 37 to 39 can be formed at the same time without distortion, the production cost can be reduced, and the area around the second passage 35b can be sealed reliably by the seals 40 provided in the seal grooves 37 to 39.

Figure 5:
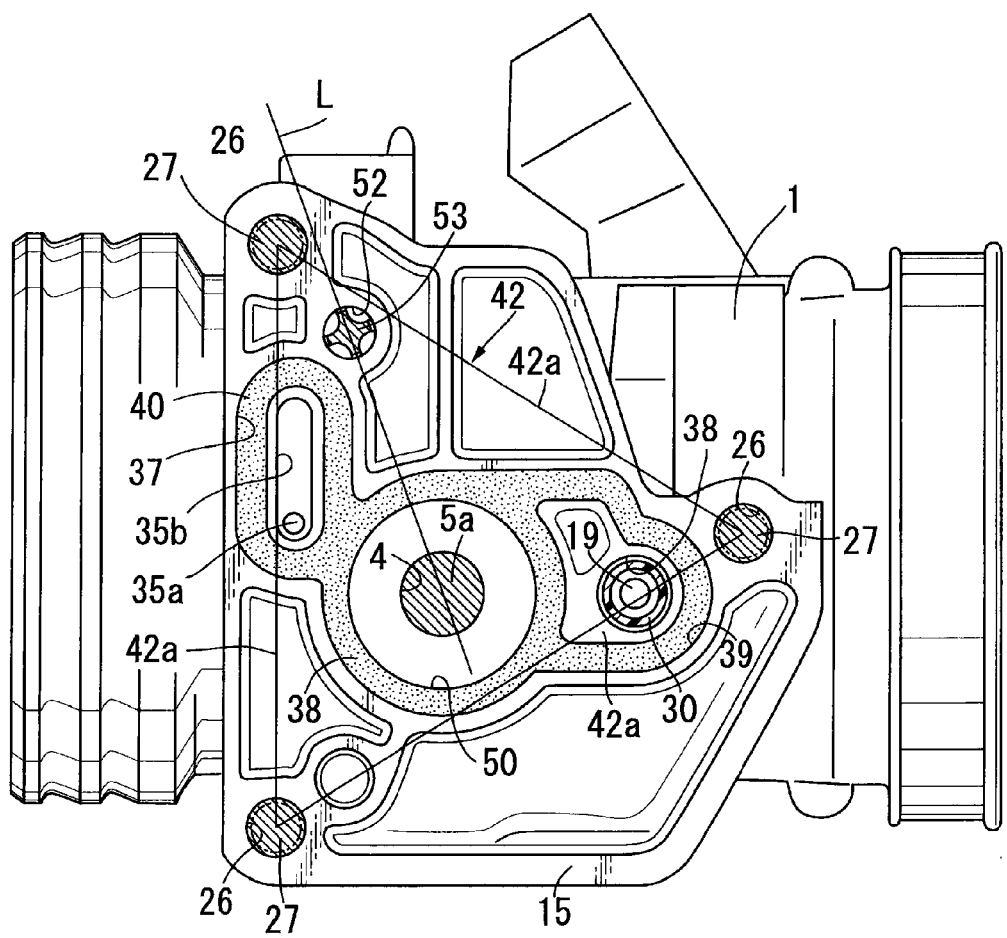
FIG. 5 is a sectional view along line 5-5 in FIG. 3.
Figure 6:
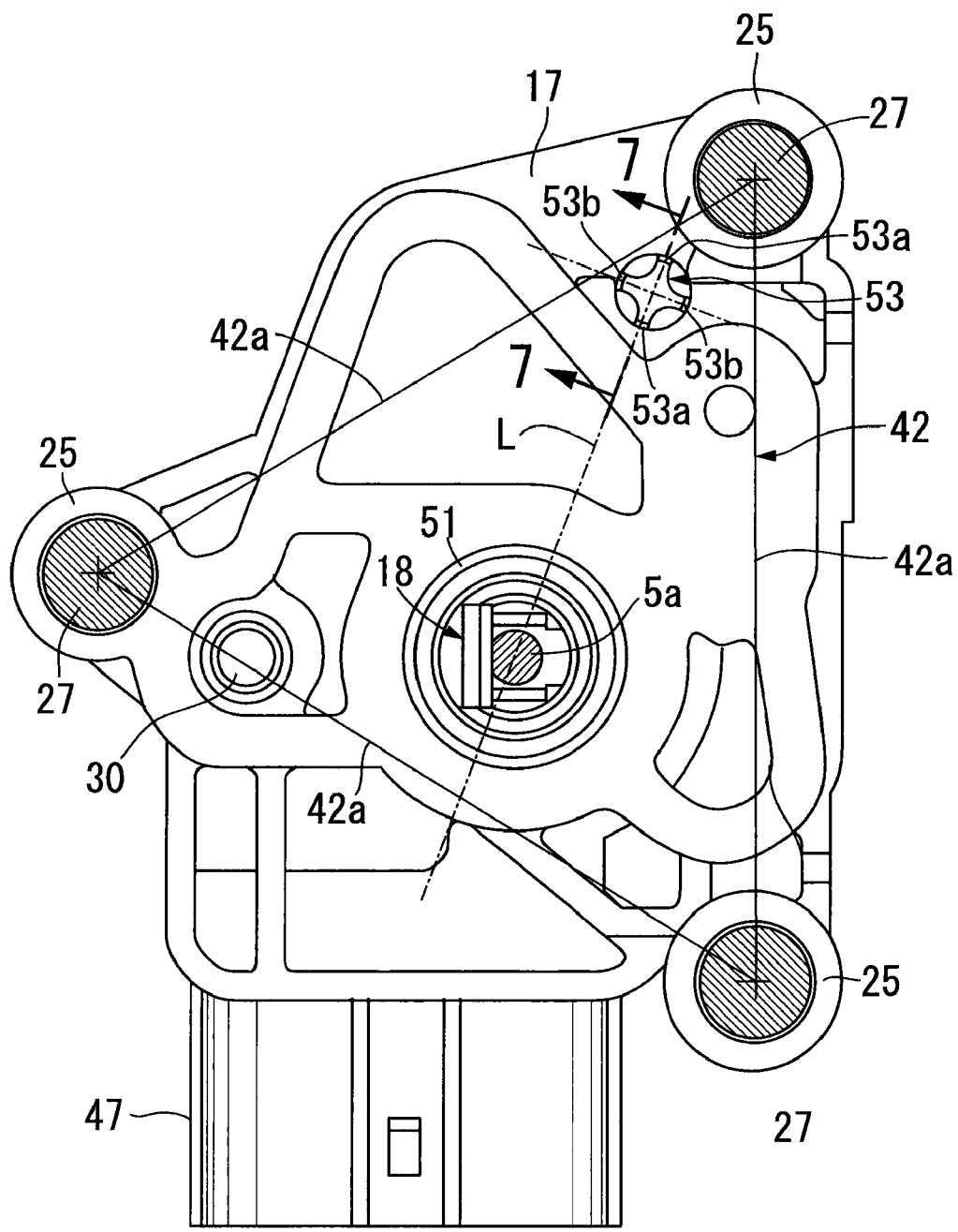
FIG. 6 is a sectional view along line 6-6 in FIG. 3.

Furthermore, the second passage 35b is disposed within a polygon 42 (ref. FIG. 5 and FIG. 6) formed by joining the centers of at least three mounting bosses 25 of the sensor housing 17 with straight lines 42a in sequence, and is disposed along one of the straight lines 42a of the polygon 42. By so doing, it is possible to efficiently transmit the fastening force of the bolts 27 from the mounting bosses 25 to the seals 40 around the second passage 35b, thus reliably carrying out sealing around the second passage 35b.

Figure 4:
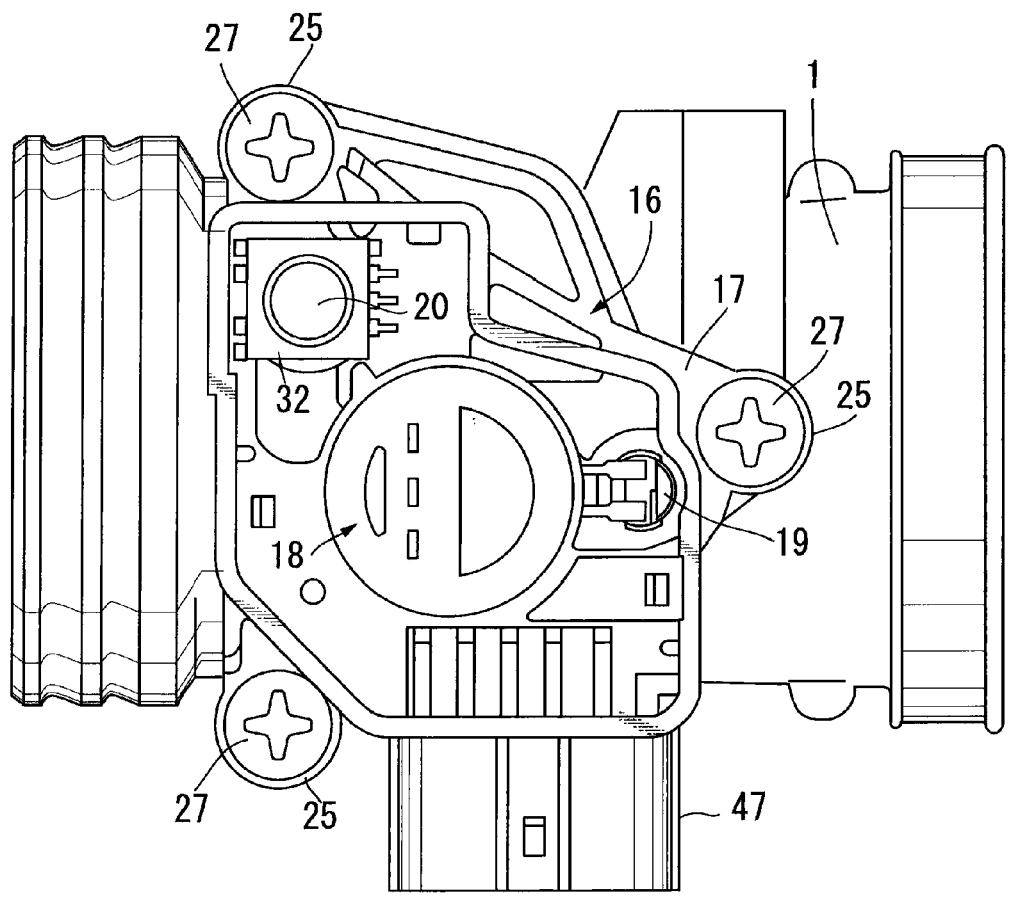
FIG. 4 is a view from arrow 4 in FIG. 3, showing a state in which an electronic control unit is detached.

As shown in FIG. 1 and FIG. 4, a board 45 of the electronic control unit 21 is disposed in an outer end part of the sensor housing 17. In this arrangement, terminals of the throttle sensor 18, the intake temperature sensor 19, and the negative pressure sensor 20 are connected to the board 45. Furthermore, various types of semiconductor devices 46 are attached to the board 45. Moreover, a coupler 47 is formed integrally with one side of the sensor housing 17, the coupler 47 taking to the outside output signals from the various types of sensors 18 to 20 via the electronic control unit 21.

When the engine is running, the output signal from each of the throttle sensor 18, the intake temperature sensor 19, and the negative pressure sensor 20 is used for control of the amount of fuel injected, the ignition timing, the fast idle intake volume, etc.

Since the negative pressure transmission path 35 opens on the periphery of the upper half of the intake path 2, it is possible to prevent fuel droplets that have become attached to the inner periphery of the intake path 2 and flowed down from entering the negative pressure transmission path 35.

Furthermore, even if fuel or foreign matter such as carbon enters the negative pressure transmission path 35 via the intake path 2 due to the engine intake blow-back phenomenon, since the negative pressure sensor 20 is a considerable distance above the opening of the negative pressure transmission path 35 in the intake path 2 and the negative pressure transmission path 35 is formed from the first to third passages 35a to 35c in a crank shape having a large flow path resistance, the above-mentioned foreign matter cannot reach the negative pressure sensor 20, and it is therefore possible to protect the negative pressure sensor 20 from the foreign matter, thus maintaining the function and durability thereof.

A case in which a plurality of types of throttle body 1 in which the diameter of the intake path 2 varies are produced by casting or injection without changing the shape of the mounting face 15 of the throttle body 1 for the sensor unit 16 is now explained; as shown in FIG. 3, large and small intake paths 2L and 2S having different diameters are both formed so as to contact the open end side of the bearing hole 4 in the intake path 2. When the large-diameter intake path 2L is formed, the inner peripheral face enlarges so as to remove the first passage 35a of the negative pressure transmission path 35, but since the first passage 35a is originally disposed so as to be in proximity to the horizontal plane H containing the axis of the intake path, the amount removed by the enlarged inner peripheral face of the intake path 2 is very small, and it is therefore possible to reliably obtain the effect resulting from bending of the negative pressure transmission path 35 in any type of throttle body 1, thereby preventing foreign matter from entering the negative pressure sensor 20. When the small-diameter intake path 2S is formed, since the first passage 35a becomes slightly longer, there is no problem.

Figure 7:
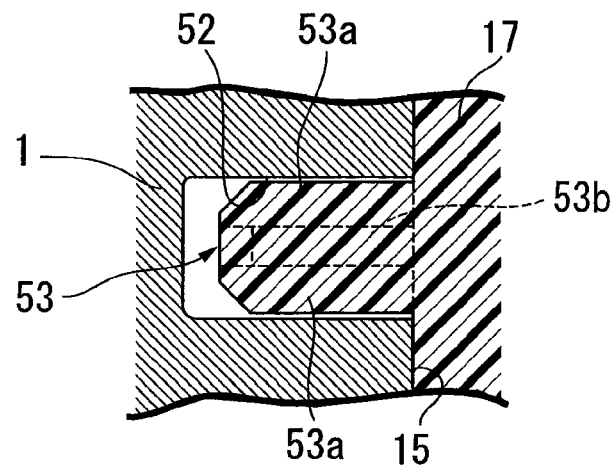
FIG. 7 is an enlarged sectional view along line 7-7 in FIG. 6.
Figure 8:
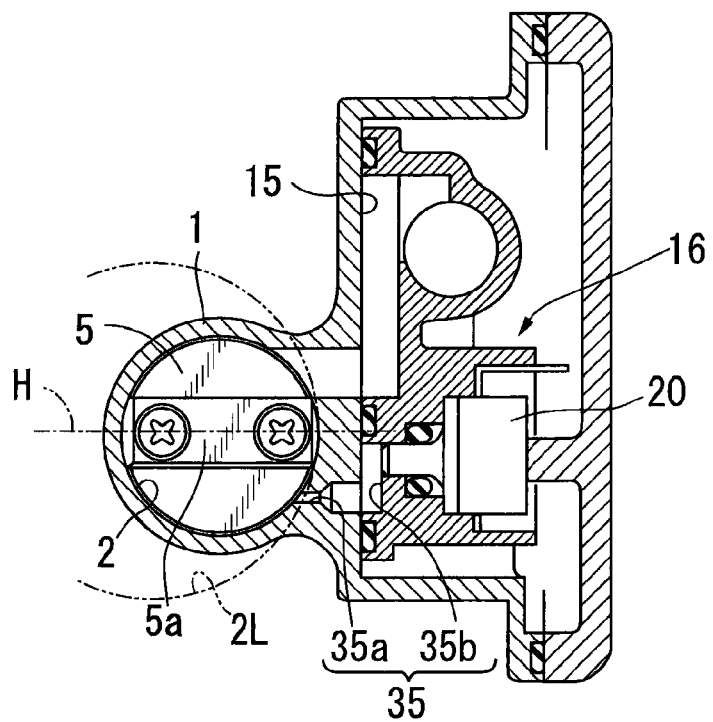
FIG. 8 is a view, corresponding to FIG. 3, of a conventional engine intake system.

The structure for positioning and fixing the sensor housing 17 on the mounting face 15 is now explained by reference to FIG. 5 to FIG. 7.

Provided on the mounting face 15 of the throttle body 1 are a circular positioning recess 50 coaxially surrounding the valve shaft 5a, and a positioning hole 52 radially spaced from the positioning recess 50. The sensor housing 17 is made of a synthetic resin, and is formed by molding a positioning tube 51 for mating with the positioning recess 50 and a positioning pin 53 for mating with the positioning hole 52 together with the three or more mounting bosses 25 at the same time as the sensor housing 17 is molded. In this arrangement, the positioning pin 53 is formed by integrally joining four radially projecting ridges 53a, 53a, 53b, and 53b so as to have a cross-shaped cross-section, and is disposed so that a pair of the ridges 53a and 53a arranged side by side on the diameter of the positioning pin 53 lie on the straight line L joining the center of the positioning tube 51 and the center of the positioning pin 53. The other pair of ridges 53b and 53b are therefore perpendicular to the ridges 53a and 53a.

The positioning tube 51 and the positioning pin 53 are molded so that they are clearance-fitted into the positioning recess 50 and the positioning hole 52 opening on the mounting face 15 respectively.

After forming the sensor unit 16, when the sensor housing 17 is mounted on the mounting face 15, the positioning tube 51 and the positioning pin 53 are first clearance-fitted into the positioning recess 50 and the positioning hole 52 respectively. This determines the position at which the mounting bosses 25 are fixed, and in the illustrated example the three mounting bosses 25 can be made to coincide with the three corresponding screw holes 26 in the mounting face 15. The bolt 27 inserted through each of the mounting bosses 25 is screwed and tightened into the screw hole 26. The sensor housing 17 is thus fixed to a predetermined position of the mounting face 15.

As hereinbefore mentioned, since the positioning pin 53 is formed by integrally joining the four radially projecting ridges 53a, 53a, 53b, and 53b so as to have a cross-shaped cross-section, and the pair 53a and 53a on the diameter of the positioning pin 53 are disposed so as to lie on the straight line L joining the center of the positioning tube 51 and the center of the positioning pin 53, when positioning the sensor housing 17, rotation of the sensor housing 17 around the positioning tube 51 is prevented by mating between the positioning pin 53 and the positioning hole 52, and in particular by mating of the pair of positioning ridges 53b and 53b of the positioning pin 53 arranged side by side in a direction perpendicular to the straight line L with the inner periphery of the positioning hole 52. It is therefore possible to obtain a predetermined precision in positioning the sensor housing 17 around the positioning tube 51 by taking into consideration only the manufacturing tolerance of the positioning ridges 53b and 53b, thus simplifying the quality control and contributing to a reduction in cost.

Furthermore, the pair of ridges 53a and 53a arranged on the straight line L are coupled integrally to the other pair of ridges 53b and 53b to thus reinforce each other, thereby strengthening the rigidity of the positioning pin.

Moreover, since the ridges 53a, 53a, 53b, and 53b are clearance-fitted in the positioning hole 52, even if the sensor housing 17 expands due to heat generated by the engine and the distance between the centers of the positioning tube 51 and the positioning pin 53 changes slightly, the change can be absorbed by the clearance between the positioning pin 53 and the positioning hole 52, and it is therefore possible to prevent the sensor housing 17 from being distorted and the throttle sensor 18 from malfunctioning due to the distortion.

An embodiment of the present invention is explained above, but the present invention is not limited thereto and can be modified in a variety of ways as long as the modifications do not depart from the spirit and scope of the present invention.

The invention claimed is:

1. An engine intake system comprising a throttle body (1) having a horizontal intake path (2), a butterfly type throttle valve (5) mounted on a valve shaft (5a) horizontally and rotatably supported by a bearing hole (4) of the throttle body (1), the throttle valve (5) opening and closing the intake path (2), and a sensor unit (16) formed by mounting a throttle sensor (18) and a negative pressure sensor (20) on a sensor housing (17) mounted on one side of the throttle body (1), the throttle sensor (18) detecting a degree of opening of the throttle valve (5), the negative pressure sensor (20) detecting an intake negative pressure of the intake path (2), and the intake path (2) and the negative pressure sensor (20) being connected via a negative pressure transmission path (35), characterized in that the negative pressure transmission path (35) is formed in a crank shape from a first passage (35a) having one end opening on a peripheral face of an upper half of the intake path (2) in proximity to a horizontal plane (H) containing an axis of the intake path (2), a groove-shaped second passage (35b) formed between mating faces of the throttle body (1) and the sensor housing (17) so as to extend while bending upward at substantially right angles from the other end of the first passage (35a), and a third passage (35c) formed in the throttle body (1) so as to extend from the upper end of the second passage (35b) in a direction opposite to the first passage (35a) and reach the negative pressure sensor (20).

2. The engine intake system according to claim 1, wherein the second passage (35b) and a seal groove (37) are formed in a mounting face (15) of the throttle body (1) side, the seal groove (37) surrounding the second passage (35b) and being equipped with a seal (40).

3. The engine intake system according to claim 1 or 2, wherein the second passage (35b) is disposed within a polygon (42) formed by sequentially joining with straight lines (42a) the centers of at least three fastening parts (25) for fastening the throttle body (1) and the sensor housing (17), the second passage (35b) being disposed along one of said straight lines (42a).

4. The engine intake system according to any one of claims 1 to 2, wherein a positioning recess (50) coaxially surrounding the valve shaft (5a) of the throttle valve (5) and a positioning hole (52) spaced from the positioning recess (50) are provided in the mounting face (15) formed on one side of the throttle body (1), and a positioning tube (51) for mating with the positioning recess (50) and a positioning pin (53) for mating with the positioning hole (52) are formed on the sensor housing (17), which is made of a synthetic resin and joined to the mounting face (15) via a plurality of bolts (27), the positioning pin (53) being formed by integrally joining four radially projecting ridges (53a, 53a, 53b, 53b) so as to have a cross-shaped cross-section, and the positioning pin (53) being disposed so that a pair of the ridges (53a, 53a) projecting in opposite directions from each other lie on a straight line (L) joining the center of the positioning tube (51) and the center of the positioning pin (53).

5. The engine intake system according to claim 4, wherein the positioning pin (53) is clearance-fitted into the positioning hole (52).

* * * * *